United States Patent [19]

Obayashi et al.

[11] Patent Number: 4,858,568

[45] Date of Patent: Aug. 22, 1989

[54] INTAKE APPARATUS FOR INTERNAL COMBUSTION ENGINE

[75] Inventors: Hideki Obayashi, Okazaki; Yoshitaka Nishio, Nagoya; Tokio Kohama, Nishio; Hiroyuki Goto, Anjo, all of Japan

[73] Assignee: Nippondenso Co., Ltd., Kariya, Japan

[21] Appl. No.: 218,244

[22] Filed: Jul. 13, 1988

[30] Foreign Application Priority Data

Jul. 17, 1987 [JP] Japan .................. 62-179416

[51] Int. Cl.$^4$ ............................................. F02B 27/02
[52] U.S. Cl. ............................ 123/52 M; 123/52 MC
[58] Field of Search ......... 123/52 M, 52 MC, 52 MB, 123/52 MV, 188 M, 432, 308

[56] References Cited

U.S. PATENT DOCUMENTS 4,617,897 10/1986 Sasaki et al. .................. 123/52 MB
4,646,689 3/1987 Katsumoto et al. ............ 123/52 MB

FOREIGN PATENT DOCUMENTS 0173519 10/1984 Japan .................. 123/52 M
60-12626 1/1985 Japan .
60-18222 2/1985 Japan .
60-8117 3/1985 Japan .
0147531 8/1985 Japan .................. 123/52 M
61-4821 1/1986 Japan .
61-4823 1/1986 Japan .
61-61910 3/1986 Japan .

Primary Examiner—David A. Okonsky
Attorney, Agent, or Firm—Cushman, Darby & Cushman

[57] ABSTRACT

An intake apparatus for an internal combustion engine that has a first intake passage communicating with a combustion chamber of the internal combustion engine; a second intake passage which communicates with the combustion chamber of the internal combustion engine and whose length is greater than a length of the first intake passage; a valve for selectively changing over the communication/shutting off of the combustion chamber of the internal combustion engine with/from between the first or/and second intake passages; and a drive circuit for driving the valve to effect the changing over operation. A controller controls the drive circuit, and an air cleaner device introduces clean air into the combustion chamber of the internal combustion engine. The first and second intake passages are disposed inside a case of the air cleaner device, and the valve is disposed at a position which is prevented from interfering the outlet side of the second intake passage when the first intake passage is closed by the valve and the second intake passage is opened by the valve.

6 Claims, 13 Drawing Sheets

INTAKE APPARATUS FOR INTERNAL COMBUSTION ENGINE

FIELD OF THE INVENTION:

The present invention relates to an intake apparatus which is capable of making the length of an intake passage of an internal combustion engine variable in correspondence with an operating state of the internal combustion engine.

In an internal combustion engine, the characteristics of the intake efficiency varies remarkably owing to the dynamic effect including the inertia effect and pulsation effect of an intake system if the length of an intake passage is varied in correspondence with the engine speed (the number of revolutions per unit time).

In other words, if the intake passage is short when the engine speed is high, the intake efficiency is high, while, if, on the contrary, the intake passage is long when the engine speed is low, the intake efficiency is high.

For this reason, there has been need to vary the length of the intake passage in correspondence with the engine speed of the internal combustion engine, thereby to improve the intake efficiency over a wide range of the engine speed.

In connection with a solution of this need, Japanese Utility Model Examined Publication No. 60-8117, Japanese Patent Unexamined Publication No. 61-4821, etc. are known.

According to the aforementioned known techniques, two intake pipes having different lengths are provided in parallel between an air cleaner and an intake port of an internal combustion engine, and an on-off valve for opening or closing a shorter intake pipe is provided, the on-off valve being opened and closed in correspondence with the speed of the internal combustion engine, thereby varying the length of the intake passage from the air cleaner to the intake port. In these known techniques, however, since two independent intake pipes are provided between the air cleaner and the intake port of the internal combustion engine, the apparatus becomes large in size, so that there has been the problem that the availability or efficiency with which the apparatus is installed in a tight space, such as an engine room, is poor.

SUMMARY OF THE INVENTION:

Accordingly, an object of the present invention is to provide an intake apparatus for an internal combustion engine which can be made compact as a whole, thereby overcoming the above-described drawbacks of the prior art.

Another object of the present invention is to provide an intake apparatus for an internal combustion engine which is capable of making effective use of the inertia effect of intake air and of increasing the volumetric efficiency even in a low-speed range.

Still another aspect of the present invention is to provide an intake apparatus for an internal combustion engine which excels in the efficiency with which the apparatus can be installed in a tight space and of preventing the leakage of pressure waves when an intake passage is changed over.

To these ends, according to the present invention, there is provided an intake apparatus for an internal combustion engine, comprising: a first intake passage means communicating with a combustion chamber of the internal combustion engine; a second intake passage means which communicates with the combustion chamber of the internal combustion engine and whose length is set to be greater than that of the first intake passage means; a valve means for selectively changing over the communication/shutting off of the combustion chamber of the internal combustion engine with/from between the first or/and second intake passage means; a drive means for driving the valve means in such a manner as to cause the valve means to effect the changing-over operation; a controller for controlling the drive means in correspondence with an operating state of the internal combustion engine to allow the valve means to effect a changing-over operation; and an air cleaner device for introducing clean air into the combustion chamber of the internal combustion engine, wherein the first and second intake passage means are disposed inside a case of the air cleaner device, and the valve means is disposed at a position, on an outlet side of the first and second intake passages, at which the outlet side of the first intake means is prevented from interfering the outlet side of the second passage means when the first intake means is closed by the valve means and the second intake passage means is opened.

In the intake apparatus according to the present invention, since the first and second intake passage means having different lengths are provided inside the case of the air cleaner device, it is possible to overcome the problem of the intake apparatus having become large in size due to the provision of two independent intake pips between the air cleaner and the intake port, thereby making it possible to make the intake apparatus compact.

In addition, in the intake apparatus of the present invention, because the valve means is disposed at a position, on the outlet side of the first and second intake passages, at which the outlet side of the first intake means is prevented from interfering the outlet side of the second passage means when the first intake means is closed by the valve means and the second intake passage means is opened, the vibration characteristics of air column of the second passage means are not substantially affected by the presence of the first passage means, even when the first passage means is closed by the valve means. Hence, the intake air inertia effect can be effectively utilized, so that the volumetric efficiency in a low-speed range can be enhanced.

Namely, if the valve means is assumed to be provided in, for instance, an intermediate portion in the longitudinal direction of the first intake passage means, when the first intake passage means is closed and the second intake passage means having a greater length than the first intake passage means is opened to improve the volumetric efficiency at the low engine speed, a certain volume portion or space is formed in the first intake passage means on the internal combustion engine-side of the valve means. As a result, there is a possibility that a negative-pressure wave generated by the intake action of a piston may be reflected in the volume portion and returned as a positive pressure wave. In other words, in this case, since the shape of the space in an intake system changes substantially due to the presence of the volume portion, s compared with a case in which the volume portion is not provided, the vibration characteristics of the air column of the intake system would change, so that it will become hardly possible to make effective use of the intake inertia effect. Hence, it would be difficult to increase the volumetric efficiency in a low-speed range. In other words, even if the second intake passage means having a longer length is opened at the low engine speed, since the volume portion is formed, the case may possibly become identical with one in which the intake passage with a shorter length is opened. (Refer to a case in which the intake efficiency cannot be improved by the dynamic effect as in a curve indicated by a dotted line γ in FIG. 10 to be explained later.)

In contrast to the case assumed above, in the case of the intake apparatus of the present invention, since the valve means is provided at a position of the outlet side which is capable of avoiding the above-described interference, the intake inertia effect can be utilized effectively, so that the volumetric efficiency in the low-speed range can be enhanced.

According to an embodiment of the present invention, the valve means is in the form of tubular structure disposed at a portion where the outlet side of the first intake passage means and the outlet side of the second intake passage means joins together, the tabular structure having a pivotal shaft at one end thereof. More preferably, the joint portion where the valve means is disposed is provided with a step against which an external surface of the valve means except for the pivotal shaft abuts when the valve means is located at a terminating point of rotation.

In addition, according to a preferred embodiment of the present invention, the first intake passage means is disposed at a substantially central position of the interior of the case of the air cleaner device, while the second intake passage means is disposed in such a manner as to helically surround an outer periphery of the first intake passage means.

According to a preferred embodiment of the present invention, when an engine speed of the internal combustion engine is lower than a predetermined engine speed, the first intake passage means is closed by the valve means via the controller to open the second intake passage means, while, when the engine speed of the internal combustion engine is higher than the predetermined engine speed, the first intake passage means is opened by the valve means via the controller and the second intake passage means is closed by the valve means.

According to another preferred embodiment of the present invention, the controller is adapted to control the drive means so as to set the valve means in any of a first position for shutting off the first intake passage means and opening the second intake passage means, a second position for shutting off the second intake passage means and opening the first intake passage means, and a third position, which is an intermediate position between the first and second positions, for partially opening the first and second passage means, respectively.

According to a further preferred embodiment of the present invention, the drive means is constituted by a two-stage vacuum actuator which can be operated in two stages.

In addition, according to a preferred embodiment of the present invention, the intake passage closer to the combustion chamber than the joint portion is connected to the first intake passage means at an angle of from 90 to 180 degrees, and is also connected to the second intake passage means at an angle of from 90 to 180 degrees.

According to a preferred embodiment of the present invention, as a step portion is provided in the joint portion of the combustion chamber-side of the first intake passage means and the combustion chamber-side of the second intake passage where, when either one of the first intake passage means or the second intake passage means is closed, an opposite side of the valve means which is not pivotally supported is adapted to abut against the step, the first intake passage means or the second intake passage means closed by the valve means can be sealed without leakage.

Accordingly, it is possible to vary the length of the intake passage through which the combustion air is supplied to the combustion chamber of the internal combustion engine, thereby improving the intake efficiency in accordance with an operating state of the internal combustion engine.

The above and other objects, features and advantages of the present invention will become more apparent from the description set forth hereinafter, when considered in conjunction with the accompanying drawings.

BRIEF DESCRIPTION OF THE DRAWINGS:

FIGS. 1 to 10 illustrates a first embodiment of the present invention, in which

FIGS. 1 and 2 are diagrammatic views schematically illustrating an intake apparatus for an engine in accordance with the first embodiment of the present invention;

FIG. 3 is an enlarge view of an inlet portion of a second intake passage;

FIGS. 4 and 5 are cross-sectional views of an outlet port of an air cleaner;

FIG. 6 is a cross-sectional view of a joint portion taken along the line VI—VI of FIG. 1;

FIG. 7 is a cross-sectional view of the joint portion taken along the line VII—VII of FIG. 1;

FIG. 8 is a block diagram of a controller;

FIG. 9 is a flowchart illustrating a processing by a microprocessor; and

FIG. 10 is a graph illustrating the volumetric efficiency of an engine in relation with an engine speed and an effective length of an intake passage;

FIGS. 11 to 15 illustrate a second embodiment of the present invention, in which FIG. 11 is a diagrammatic view schematically illustrating the intake apparatus of the engine according to the second embodiment;

FIG. 12 is a block diagram of the controller;

FIG. 13 is a flowchart illustrating a processing by the microprocessor;

FIG. 14 is a diagrammatic graph illustrating the relationship between an amount of sound arrested and a shift in the phase of pressure waves passing through the first intake passage and the second intake passage; and FIG. 15 is a graph illustrating a sound pressure level of intake noise at the time of a low- and medium-loads of the engine;

FIGS. 16 to 18 illustrate a third embodiment of the present invention, in which

FIG. 16 illustrates a state in which an on-off valve has closed the second intake passage;

FIG. 17 illustrates a state in which the on-off valve has closed the first intake passage; and FIG. 18 is a cross-sectional view taken along the line XVIII—XVIII of FIG. 16; and FIGS. 19 and 20 illustrate a fourth embodiment of the present invention, in which FIG. 19 illustrates a case in which the axis of the on-off valve is provided perpendicularly to the first intake passage;

FIG. 20 is a cross-sectional view taken along the line XX—XX of FIG. 19; and

DESCRIPTION OF THE PREFERRED EMBODIMENTS:

Referring now to the accompanying drawings, description will be given to an intake apparatus for an internal combustion engine in accordance with an embodiment of the present invention.

Figure 1:
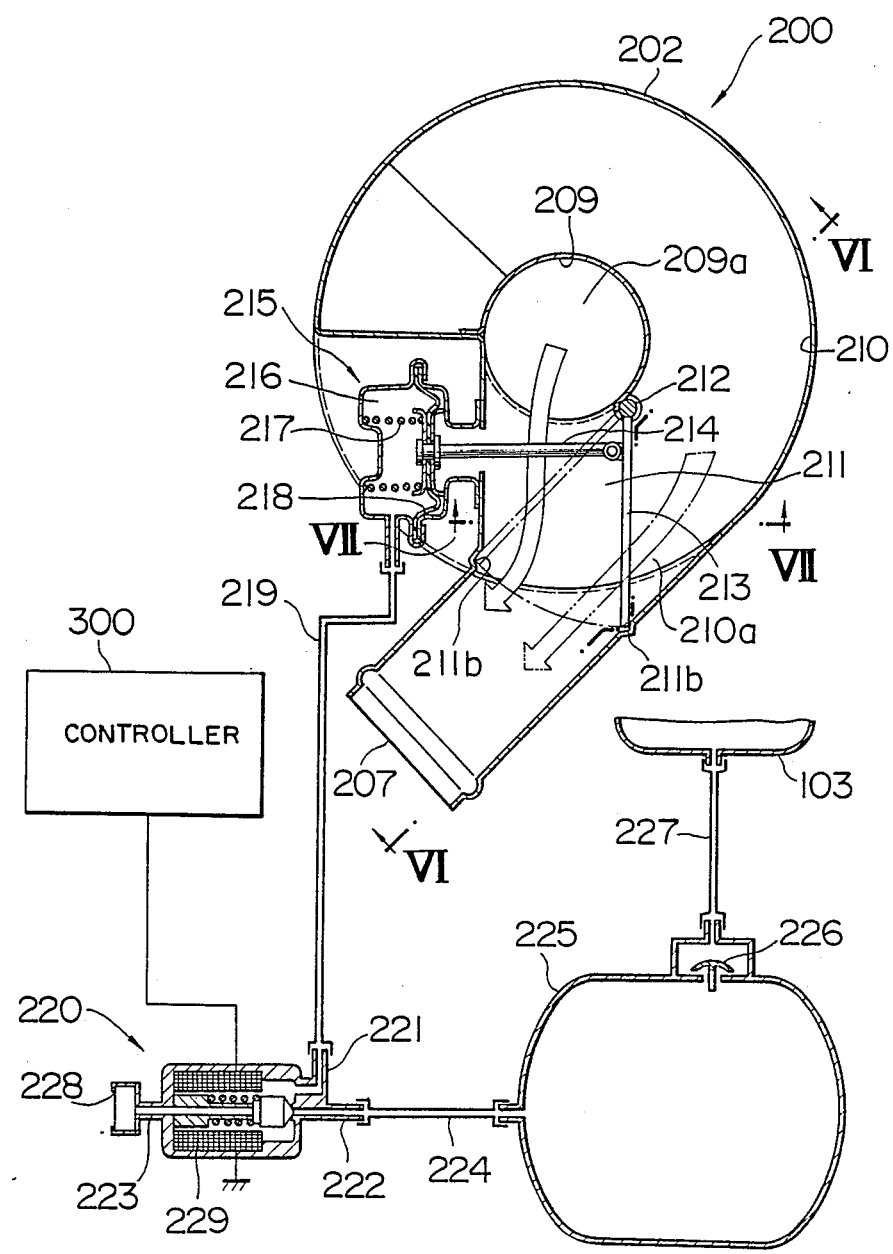
Figure 2:
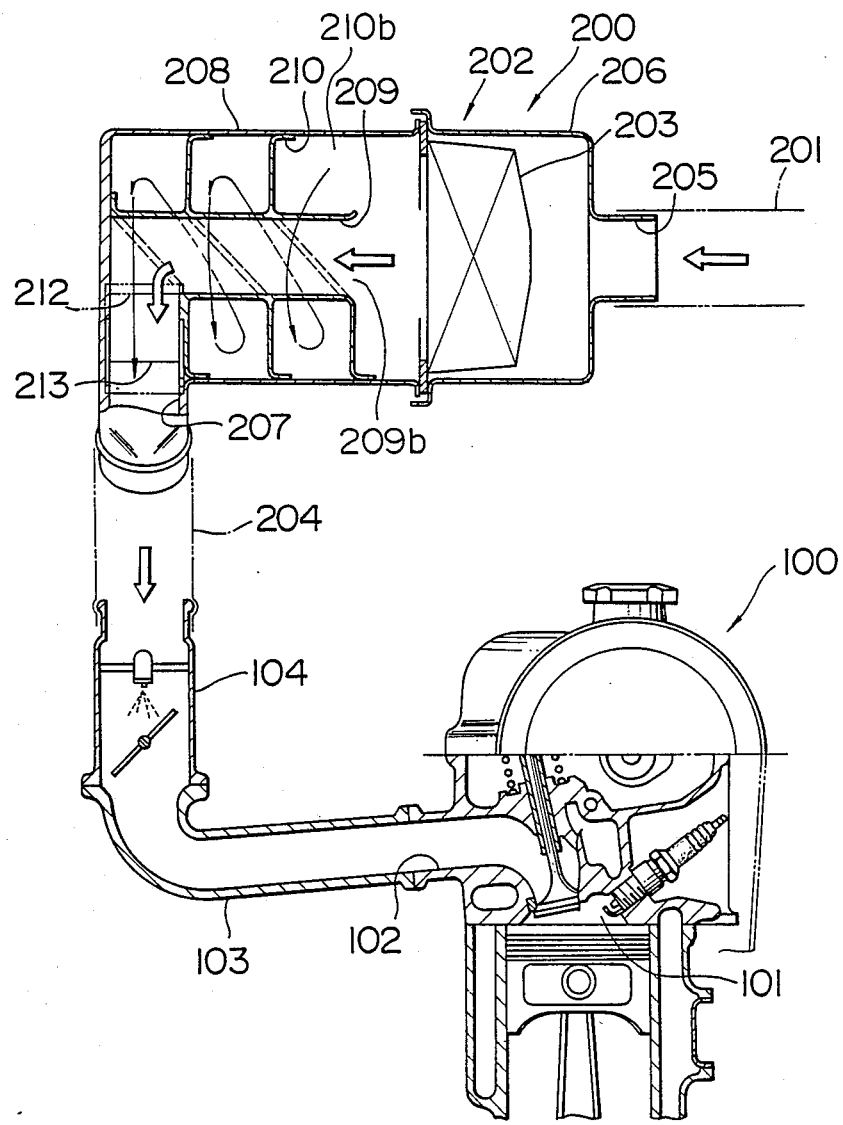

FIGS. 1 and 2 schematically illustrate the intake apparatus for the internal combustion engine in accordance with the first embodiment.

Air for combustion is supplied to a combustion chamber 101 of an engine 100 via an intake port 102, an intake manifold 103, a single-point injector body 104, and an air cleaner 200.

The air cleaner 200 in this embodiment is of the axial-flow type and is adapted to purify the air sucked through an inlet 201 by a filter element 203 accommodated in an air cleaner case 202 and to supply the same to the single-point injector body 104 via a connecting pipe 204.

The air cleaner case 202 comprises an upstream-side case 206 having an inlet port 205 to which an inlet 201 is connected as well as a downstream-side case 208 having an outlet port 207 to which a connecting pipe 204 is connected. The air cleaner case 202 supports the filter element 203 between the upstream-side case 206 and the downstream-side case 208.

A first intake passage means 209 which has a large sectional area of a passage and whose length is short, as well as a second intake passage means 210 which has a sectional area of a passage smaller than that of the first intake passage 209 and whose length is longer than the first intake passage 209 are accommodated inside the downstream-side case 208.

Figure 3:
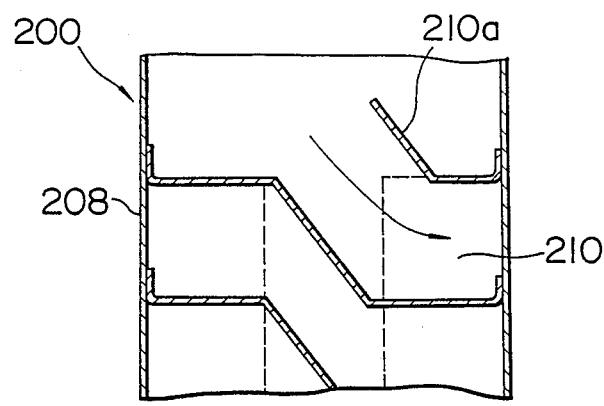

The second intake passage 210 is provided helically around an outer periphery of the first intake passage 209, as shown in FIGS. 1 and 2. In addition, as shown in FIG. 3, an auxiliary wall 210a arranged along the second intake passage is provided at an entrance portion of the second intake passage 210 inside the air cleaner case 202 to make smooth the flow of air when the combustion air flows into the second intake passage 210.

The first and second intake passages 209, 210 are constituted by a plurality of assemblies to facilitate the assembly. When these members are made of metal, they are fixed to each other by means of a connecting method such as brazing, welding or the like or by means of calking or rivetting. When the members are made of resin, they are fixed to each other by fusion welding, bonding or the like.

An end portion of the first intake passage 209 on the side of the combustion chamber 101 joins with an end portion of the second intake passage 210 on the side of the combustion chamber 101, and a joint portion 211 thereof communicates with the outlet port 207 of the air cleaner case 202. As shown in FIG. 1, the first intake passage 209 and the outlet port 207 (the intake passage closer to the combustion chamber 101 than the joint portion 211) are connected to each other by forming an obtuse angle (approximately 120 degrees), while the second intake passage 210 and the outlet port 207 are connected to each other linearly, as shown in FIG. 1. By virtue of these connections, it is possible to reduce the resistance against the air flow when the combustion air passes through the joint portion 211.

A rectangular on-off valve 213, as an example of the valve means, one end of which is configured in the form of a pivotal shaft 212 is provided in the joint portion 211. This on-off valve 213 is provided rotatably between a first position (one terminal point of rotation) for shutting off the first intake passage 209, as shown by a dot-dash line in FIG. 1, and a second position (the other terminal point of rotation) for shutting off the second intake passage 210, as shown by a solid line in FIG. 1.

Figure 4:
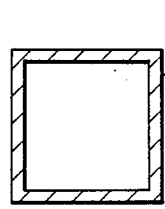
Figure 5:
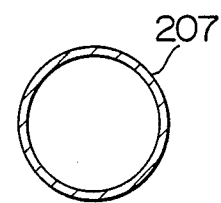

The outlet port 207 of the air cleaner case 202 on the side of the joint portion 211 has a square cross section corresponding to the rotatable on-off valve 213, as shown in FIG. 4. Meanwhile, the downstream side of the outlet port 207 is connected to the cylindrical connecting pipe 204 As a result, the outlet port 207 is formed in such a manner that a cross-sectional configuration thereof changes smoothly into a cylindrical shape from the side of the joint portion 211 to the downstream side thereof, while the downstream side of the outlet port 207 has a cylindrical cross section, as shown in FIG. 5.

Figure 6:
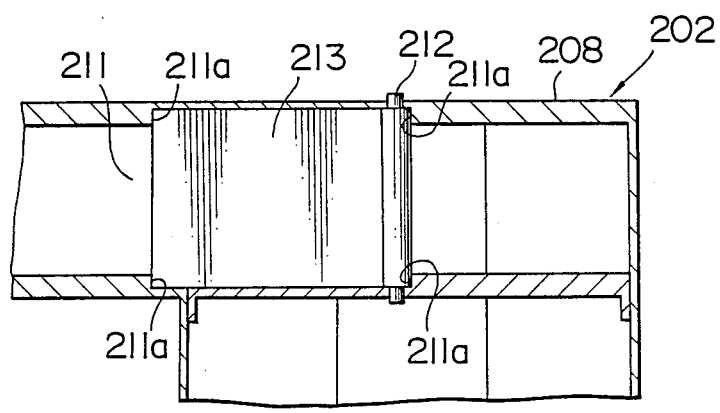
Figure 7:
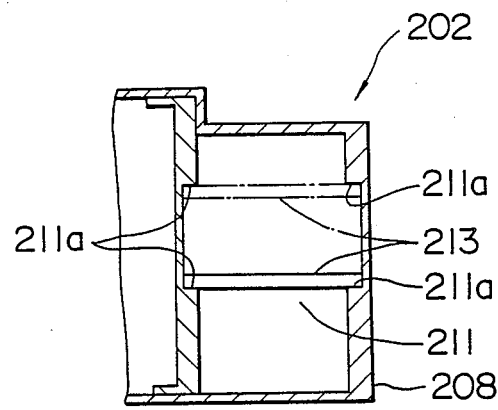

In addition, as shown in FIGS. 6 and 7, steps 211a are provided in the rotating range of the on-off valve 213 inside the joint portion 211 for accommodating the on-off valve 213. Furthermore, as shown in FIG. 1, steps 211b are provided to ensure that a distal portion (the other end) of the on-off valve 213 will not project to the joint portion 211 when the on-off valve 213 is at the first position for shutting off the first intake passage 209 and the second position for shutting off the second intake passage 210. The provision of these steps make it possible to seal the first intake passage 209 or the second intake passage 210 without any leakage when the first intake passage 209 or the second intake passage 210 is closed by the on-off valve 213.

The on-off valve 213 is connected to a vacuum actuator 215 via a rod 214 and adapted to be driven by this vacuum actuator 215.

The vacuum actuator 215 is so arranged that, when a negative pressure is introduced into a diaphragm chamber 216 thereof, the rod 214 is pushed against the action of a compression coil spring 217, thereby moving the on-off valve 213 to the aforementioned first position via the rod 214 connected to the diaphragm 218. On the other hand, when the air is introduced into the diaphragm chamber 216, the rod 214 is pushed out by the action of the compression coil spring 217, thereby moving the on-off valve 213 to the aforementioned second position.

The diaphragm chamber 216 of the vacuum or negative pressure actuator 215 is connected to a first port 221 of a solenoid-type negative pressure changeover valve 220 via a conduit 219. In addition to the first port 221, the vacuum changeover valve 220 has a second port 222 and a third port 223. The second port 222 is connected to the intake manifold 103 via a conduit 224, a vacuum or negative pressure reservoir 225, a check valve 226, and a conduit 227, while the third port 223 is connected to an air intake port 228.

When a solenoid 229 provided inside the vacuum changeover valve 220 is being energized, the first port 221 and the second port 222 are connected to each other, while when the solenoid 229 is not being energized, the first port 221 and the third port 223 are connected to each other.

The aforementioned vacuum actuator 215 and the vacuum changeover valve 220 constitute an example of the driving means.

The energization of the solenoid 229 is controlled by a controller 300 in response to the state of running of a vehicle (driving state of the vehicle).

Figure 8:
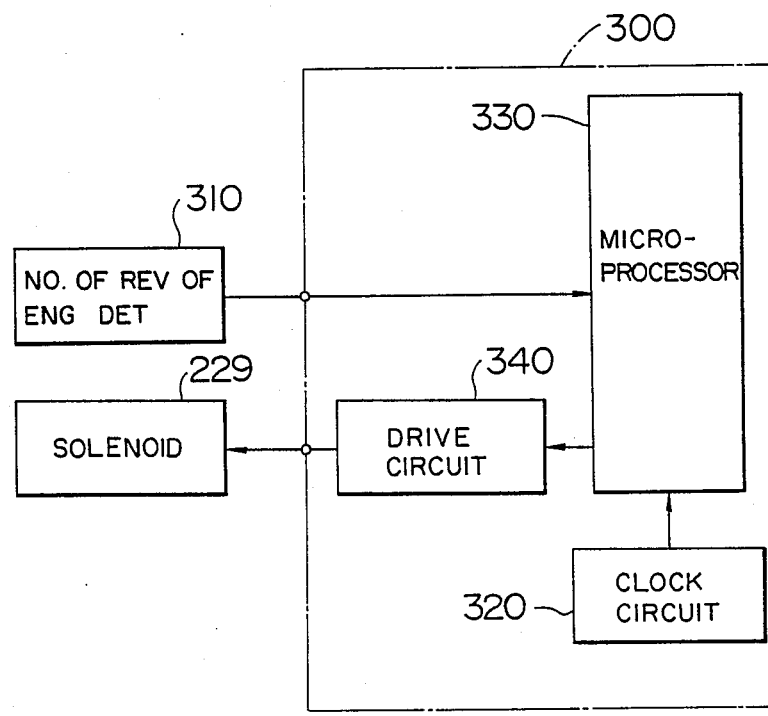

FIG. 8 shows a block diagram of the controller 300. A sensor 310 for detecting a number of rotations or revolutions of the engine 100 is connected to an input of the controller 300, while the solenoid 229 is connected to an output thereof. The sensor 310 for detecting the number of rotations of the engine 100 is adapted to generate a pulse signal corresponding to the number of revolutions of an output shaft of the engine 100.

The controller 300 has a microprocessor 330 which executes a processing, which will be described below, on the basis of the pulse signal generated by the sensor 310, a clock signal obtained from a clock circuit 320 and the like. As the result of processing by the microprocessor 330, the energization of a drive circuit 340 for allowing a driving current to flow through the solenoid 229 is controlled.

Figure 9:
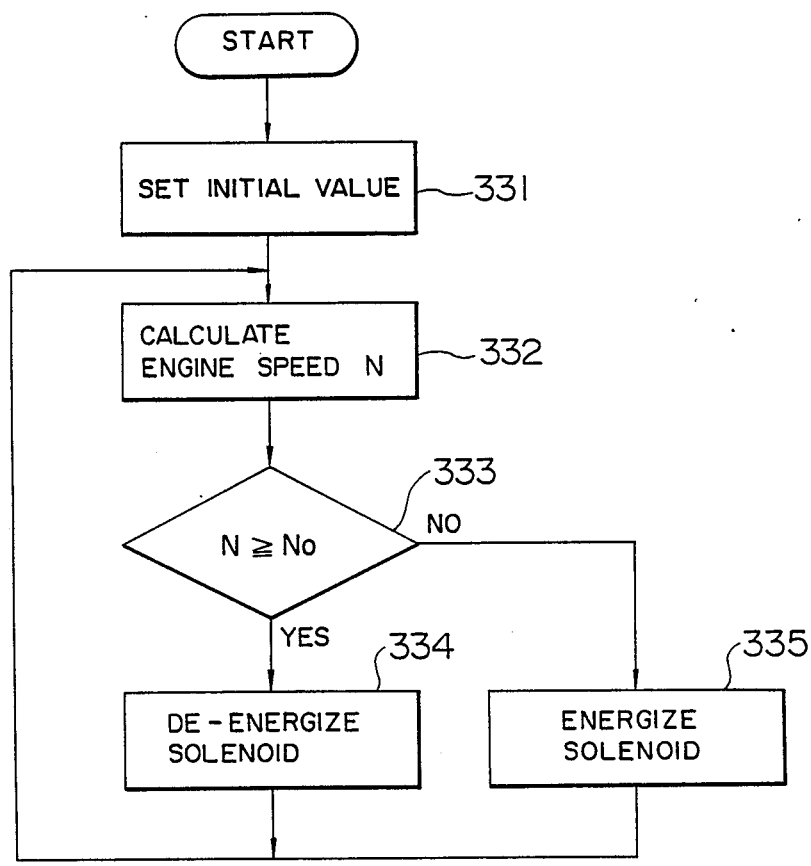

Description will now be given of the processing by the microprocessor 330 with reference to a flowchart shown in FIG. 9.

First, if a power supply (not shown) is turned on, initial values for actuating the microprocessor 330 only during starting are set in Step 331.

In Step 332, the engine speed N is then calculated on the basis of the pulse signal from the sensor 310 for detecting the number of rotations or revolutions of the engine 100 and the clock signal generated by the clock circuit 320. Subsequently, in Step 333, determination or judgment is made as to whether or not the engine speed N calculated in Step 332 is equal to or above the engine speed N0 (see FIG. 10 also) which serves as a reference level for changing over the on-off valve 213. When the result of determination in Step 333 is "NO", a control signal for energizing the solenoid 229 is delivered to the drive circuit 340 at Step 335, and the process then returns to Step 332. Meanwhile, when the result of determination in Step 333 is "YES", a control signal for de-energizing the solenoid 229 is delivered to the drive circuit 340 in Step 334, and the process then returns to Step 332.

The operation of the above-described embodiment will now be described hereafter.

First, when the engine speed N, which is one factor of the operating state of the engine 100, is lower than the preset reference engine speed N0, the solenoid 229 is energized by the operation of the controller 300, which, in turn, causes the first and second ports 221, 222 of the vacuum changeover valve 220 to be connected to each other. As a result, negative pressure is introduced into the diaphragm chamber 216 of the vacuum actuator 215, with the result that the diaphragm 218 pushes the rod 214 (upward, for example) against the action of the compression coil spring 217, thereby moving the on-off valve 213 to the first position indicated by the dot-dash line in FIG. 1.

Consequently, the first intake passage 209 is closed, so that the air to be sucked into the combustion chamber 101 of the engine 100 is supplied through the second intake passage 210, in the air cleaner 200, whose sectional area is smaller than that of the first intake passage 209 and whose length is longer than that of the same. Hence, at this time, since the effective length of the intake passage through which the air is supplied to the combustion chamber 101 becomes longer, the dynamic effect appears at an engine speed which is lower than the reference engine speed N0, as shown by α in FIG. 10. As a result, as compared with the volumetric efficiency in a case where the volume portion or space is formed at a side of the on-off valve 213 communicated with the engine 100 (shown by a curve γ in FIG. 10), the volumetric efficiency of the engine 100 can be improved, and therefore the power of the engine 100 is enhanced.

At this time, the leakage of pressure waves into the first intake passage 209 can be prevented, because the steps 211a, 211b provided in the joint portion 211 accommodating the on-off valve 213 in the rotating range of the on-off valve 213 serve to improve the sealing properties when the first intake passage 209 is closed.

In addition, since the second intake passage 210 and the outlet port 207 are connected to each other in such a manner as to form an obtuse angle, the flow of air passing through the second intake passage 210 and the outlet port 207 becomes smooth, so that the ventilation resistance or resistance against the air flow at the time when the air passes can be made low.

When the engine speed N is greater than the preset reference speed N0, the solenoid 229 is deenergized by the operation of the controller 300, which in turn connects together the first and third ports 221, 223 of the vacuum changeover valve 220. As a result, the air is introduced into the diaphragm chamber 216 of the vacuum actuator 215, and the rod 214 is pressed outwardly (downwardly, for example) through the diaphragm 218 by the action of the compression coil spring 217, thereby moving the on-off valve 213 to the second position shown by the solid line in FIG. 1.

Consequently, the second intake passage 210 is closed, and the air which is to be sucked into the combustion chamber 101 of the engine 100 flows through the first intake passage 209 which has a greater sectional area than the second intake passage 210 and whose length is shorter than the same. Accordingly, at this time, since the effective length of the intake passage through which the air is supplied to the combustion chamber 101 becomes short, the dynamic effect appears at an engine speed which is greater than the reference engine speed N0, as shown by a dot-dash line β in FIG. 10. Hence, as compared with the volumetric efficiency in a case where the volume portion is formed at a side of the on-off valve 213 communicated with the engine 100 (the graph shown by a dotted line γ in FIG. 10), the volumetric efficiency of the engine 100 can be improved, and therefore the power of the engine 100 is enhanced.

At this time, the leakage of pressure waves into the second intake passage can be prevented because the steps 211a, 211b provided in the joint portion 211 accommodating the on-off valve 213 in the rotating range of the on-off valve 213 serve to improve the sealing properties when the second intake passage 210 is closed.

In addition, since the first intake passage 209 and the outlet port 207 are connected to each other linearly, the flow of air passing through the first intake passage 209 and the outlet port 207 becomes smooth, so that the ventilation resistance at the time when the air passes can be made low.

Figure 10:
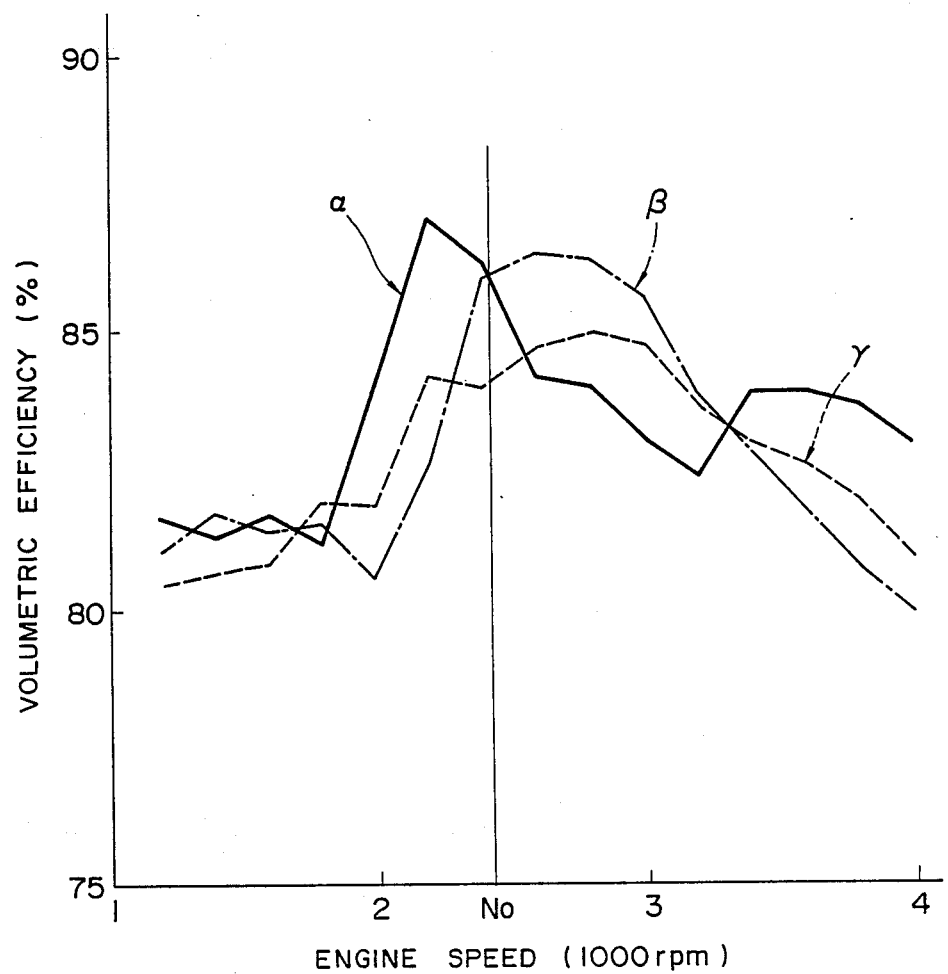

In FIG. 10, the solid line a shows the volumetric efficiency when the second intake passage 210 is selected, while the dot-dash line β shows the volumetric efficiency when the first intake passage 209 is selected.

As described above, since the length of the intake passage is changed over at the reference engine speed N0 of the engine 100, it is possible to obtain the dynamic effect in the range of a low engine speed as well as in the range of a high engine speed, so that it is possible to increase the power of the engine 100 over a wide range of the engine speed.

In addition, since the first intake passage 209 and the second intake passage 210 whose length is greater than that of the first intake passage 209 are disposed in the case 202 of the air cleaner 200, the intake apparatus for the engine capable of varying the intake passage in correspondence with the operating state of the engine 100 can be readily installed in a tight space such as an engine room. Furthermore, since the second intake passage 210 is formed helically around the outer periphery of the first intake passage 209, the second intake passage 210 can be made compact.

FIGS. 11 to 15 illustrate a second embodiment of the present invention.

In this embodiment, another vacuum or negative pressure actuator 230 is connected to the vacuum actuator 215 for driving the on-off valve 213 to form the two-stage vacuum actuator 215, 230.

The power of the engine is actually improved effectively by the dynamic effect only in a high-load operating range in which the engine load is above a predetermined level. Therefore, when the engine load is below the predetermined level, the intake noise can be reduced by opening both of the first and second intake passages 209, 210. For this purpose, the vacuum actuator is formed into two stages 215, 230. When the negative pressure is introduced into the diaphragm chambers 216, 231 of the two vacuum actuators 215, 230, the on-off valve 213 is set to the first position for closing the first intake passage 209 shown in the first embodiment described above.

Accordingly, when the negative pressure is introduced only into the diaphragm chamber 216 of the vacuum actuator 215, the on-off valve 213 can be set to an intermediate position as shown by a two-dot chain line, between the first and second positions shown in the first embodiment.

Figure 12:
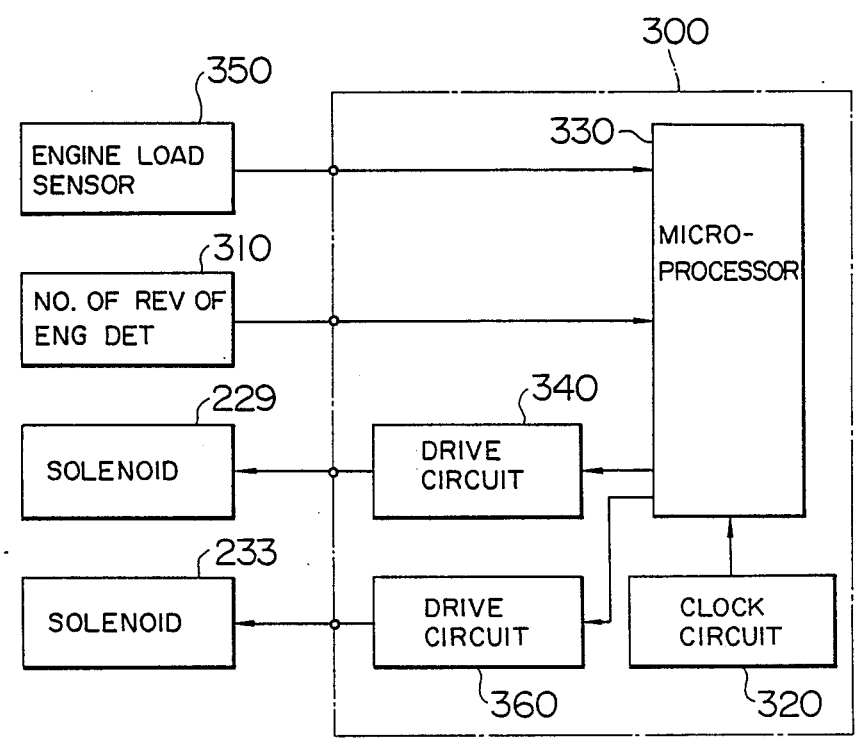

FIG. 12 illustrates a block diagram of the controller 300 in accordance with the second embodiment.

In addition to the sensor 310 for detecting number of revolutions or rotations of the engine, an engine an engine load sensor 350 for detecting the engine load is connected to an input of the controller 300, while, in addition to the solenoid 229, a solenoid 233 of a negative changeover valve 232 which is coupled to the vacuum actuator 230 is connected to an output of the controller 300. A current for the energization of the solenoid 233 is controlled by a drive circuit 360 separately from the drive circuit 340.

Figure 13:
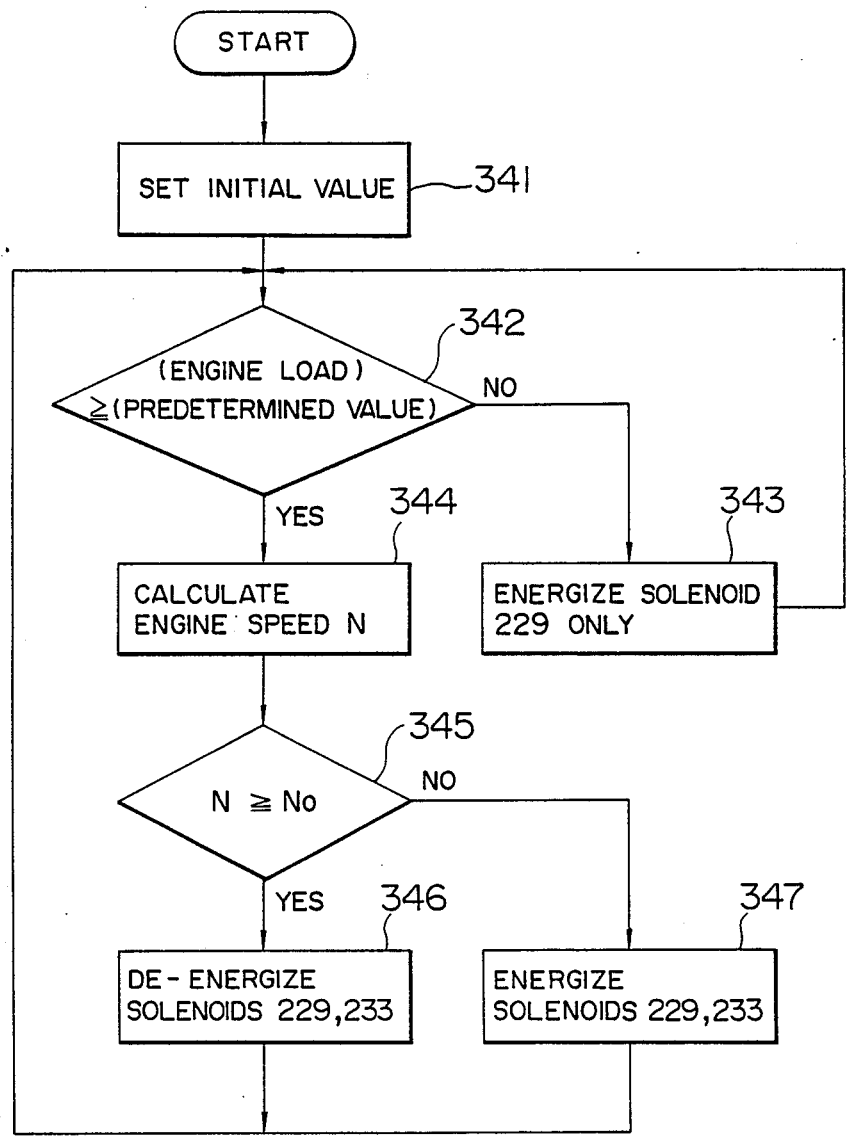

Referring now to the flowchart shown in FIG. 13, description will be given of a processing by the microprocessor 330 in accordance with the second embodiment.

First, when a power supply (not shown) is turned on, initial values for actuating the microprocessor 330 only during starting are set in Step 341.

In Step 342, determination or judgement is made in Step 342 as to whether or not the load of the engine for driving vehicle is equal to or above a predetermined level. When the result of determination in Step 342 is "NO", a control single for energizing the solenoid 229 alone is delivered to the drive circuit 340 in Step 343, and the operation then returns to step 342.

On the other hand, when the result of determination in Step 342 is "YES", the engine speed N is calculated in Step 344 on the basis of the pulse signal from the sensor 310 and the clock signal generated by the clock circuit 320. In Step 345, determination is then made as to whether or not the engine speed N calculated in Step 344 is equal to or above the engine speed N0 which serves as the reference for changing over the on-off valve 213. When the result of determination in Step 345 is "YES", a control signal for de-energizing the solenoids 229, 233 is delivered to the drive circuits 340, 360 in Step 346, and the operation the returns to Step 342. Meanwhile, if the result of determination in Step 345 is "NO", a control signal for energizing the solenoids 229, 233 is delivered to the drive circuits 340, 360 in Step 347, and the operation then returns to Step 342.

The operation of the embodiment will be described below.

First, when the load information obtained from the engine load sensor 350 is in a high-load operating range above the predetermined level (e.g. during acceleration), the second intake passage 210 having a greater length is opened when the engine speed N is lower than the predetermined reference engine speed N0 as explained in the first embodiment. Meanwhile, the first intake passage 209 is opened when the engine speed N is higher than the predetermined reference engine speed N0.

In consequence, the volumetric efficiency can be improved in both of the cases where the engine speed N is high as well as the case where the engine speed N is low by driving the on-off valve 213 to change over the intake passage at the reference engine speed N0.

Figure 11:
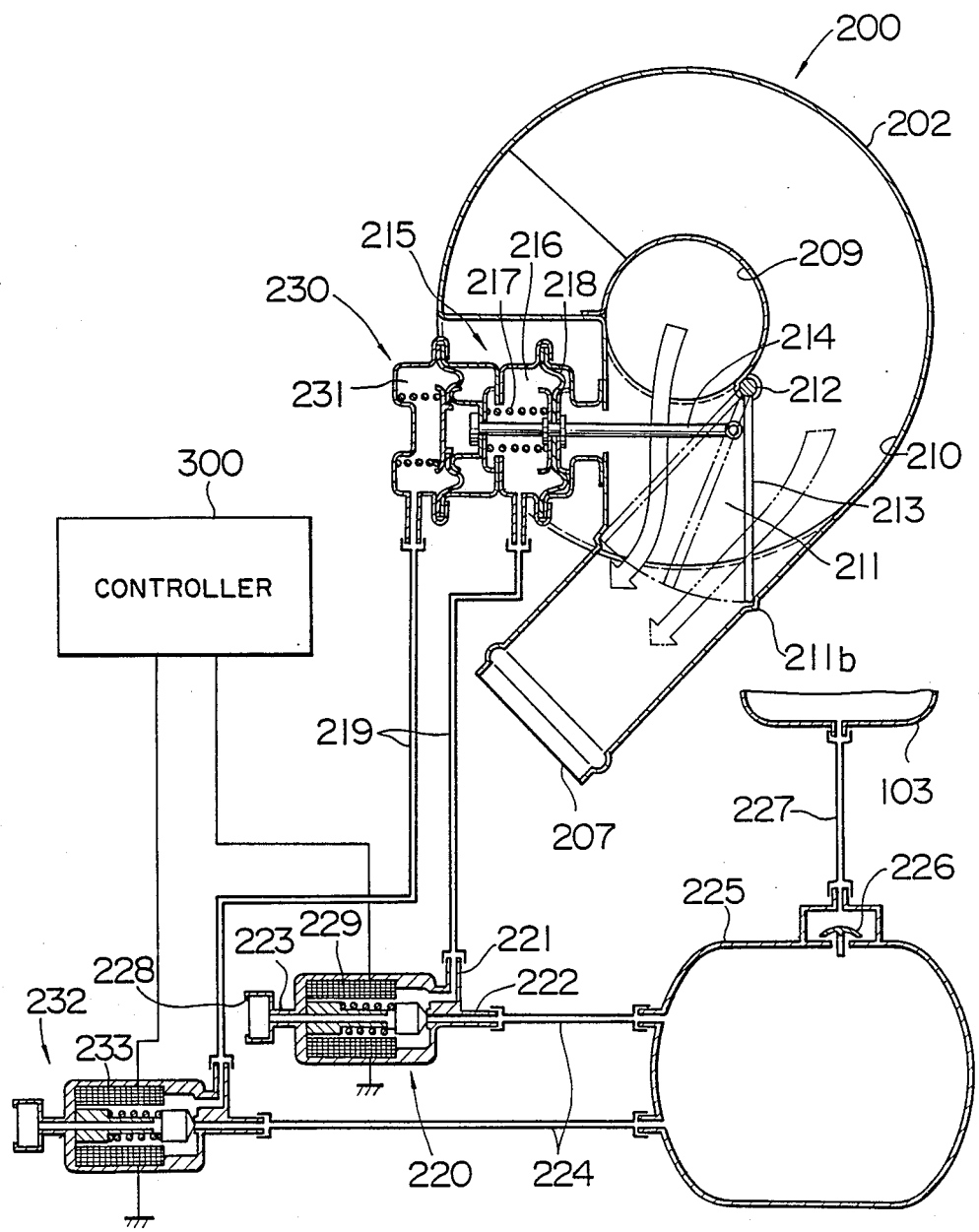

On the other hand, when the load information obtained from the engine load sensor 350 is in a lowload operating range below the predetermined level (e.g. when operated in a fixed speed), a control signal for energizing only the solenoid 229 of the vacuum changeover valve 220 is delivered from the drive circuit 340 under the control of the microprocessor 330 in the controller 300 regardless of the engine speed N, which in turn causes the vacuum actuator 215 alone to press the on-off valve 213 downwardly via the rod 214, thereby setting the on-off valve 213 at an intermediate position between the first and second positions both shown in the first embodiment, as illustrated by a two-dot chain line in FIG. 11. As a result, both the first and second intake passages 209, 210 are opened.

Figure 14:
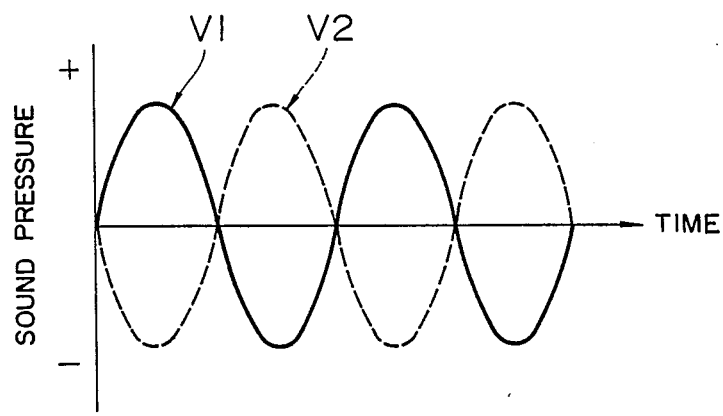

The second intake passage 210 is provided with its length adjusted in such a manner that, during the intake of air by the engine, the phase of a pressure wave V2 which has passed through the second intake passage 210 is shifted approximately 180 degrees from that of a pressure wave V1 which has passed through the first intake passage 209. As a result as shown in FIG. 14, during the air intake by the engine 100, the pressure wave is generated in an opening 209a, 210a, in the air cleaner case 202, between the first intake passage 209 and the second intake passage 210 and is transmitted in the form of the pressure wave V1 through the first intake passage 209 and the pressure wave V2 through the second intake passage 210. Since the pressure wave V1 which has passed through the first intake passage 209 and the pressure wave V2 which has passed through the second intake passage 210 are superposed so as to interfere destructively or cancel each other because of their relative phase shift of approximately 180 degrees. As a result, the air intake noise can be suppressed.

Figure 15:
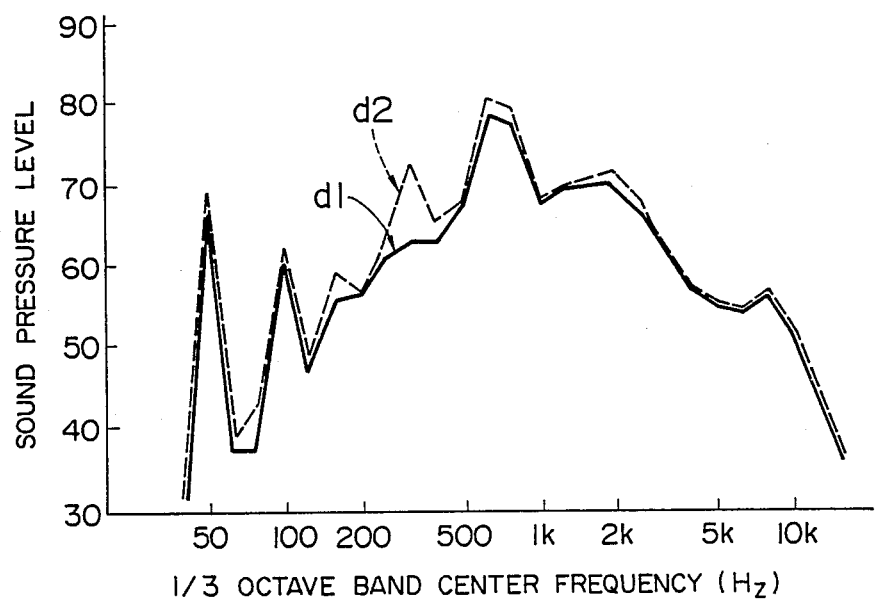

Thus, if the on-off valve 213 is set in the intermediate position between the first position and the second position, it is possible to reduce the amount of the air intake noise to a small level, as shown in a sound pressure level (solid line d1) in FIG. 15, as compared with a sound pressure level (dotted line d2) in a case where the second intake passage 210 is selected by the on-off valve 213.

The graph of FIG. 15 shows the sound pressure level when the engine speed is 1,500 r.p.m.

Subsequently, the air intake sound is released into the engine room through the inlet port 205 of the air cleaner case 202 and the inlet 201. However, if the inlet port 205 is made off-centered with respect to the opening portions 209b, 210b (see FIG. 2) for the first and second intake passages 209, 210, it is possible to even further reduce the air intake noise.

In addition, the radiation noise which presents a problem in a relatively high engine speed is radiated from the wall surfaces of suction or intake passages and the air cleaner 200. However, when the engine speed is high at the time of high load, the first intake passage 209 is open, while the second intake passage 210 provided around the outer periphery of the first intake passage 209 is closed. Therefore, the aforementioned noise is absorbed by the second intake passage 210, thereby making it possible to substantially reduce the level of radiation noise.

Since the first and second intake passages 209, 210 are accommodated in the air cleaner case 202, it is possible to increase the rigidity of the air cleaner 200, and the two-dimensional vibration of the wall of the air cleaner case 202 resulting from pulsation of the intake air can also be suppressed to a low level.

As described above, by forming the vacuum actuator for driving the on-off valve 213 into a two stage, both of the first and second intake passages 209, 210 can be opened in a low-load operating range of the engine 100, thereby making it possible to reduce to a small level the air intake noise caused by the pressure waves generated during the air intake by the engine 100.

Figure 16:
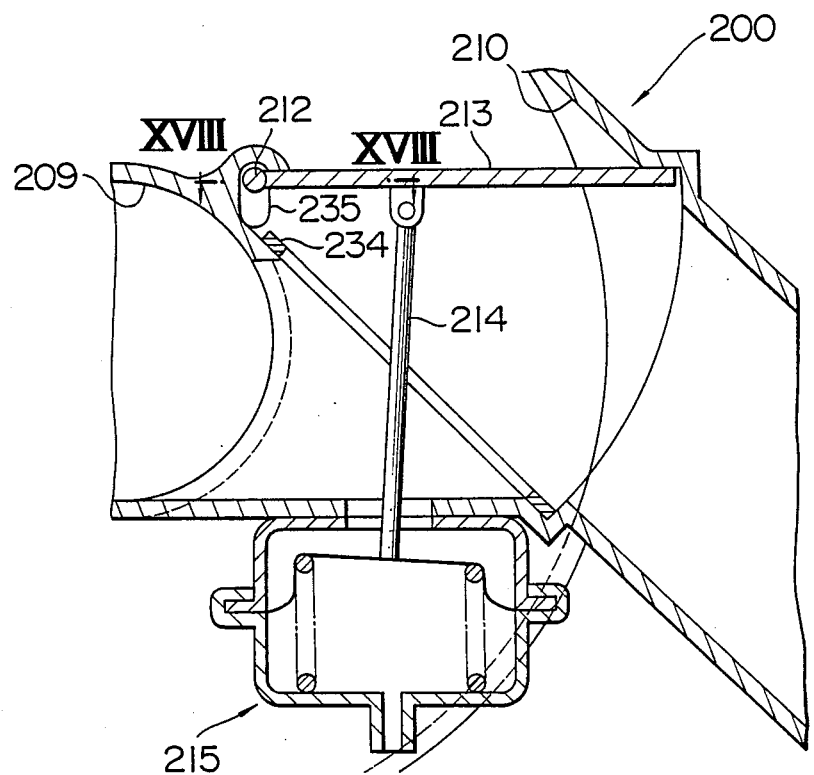
Figure 17:
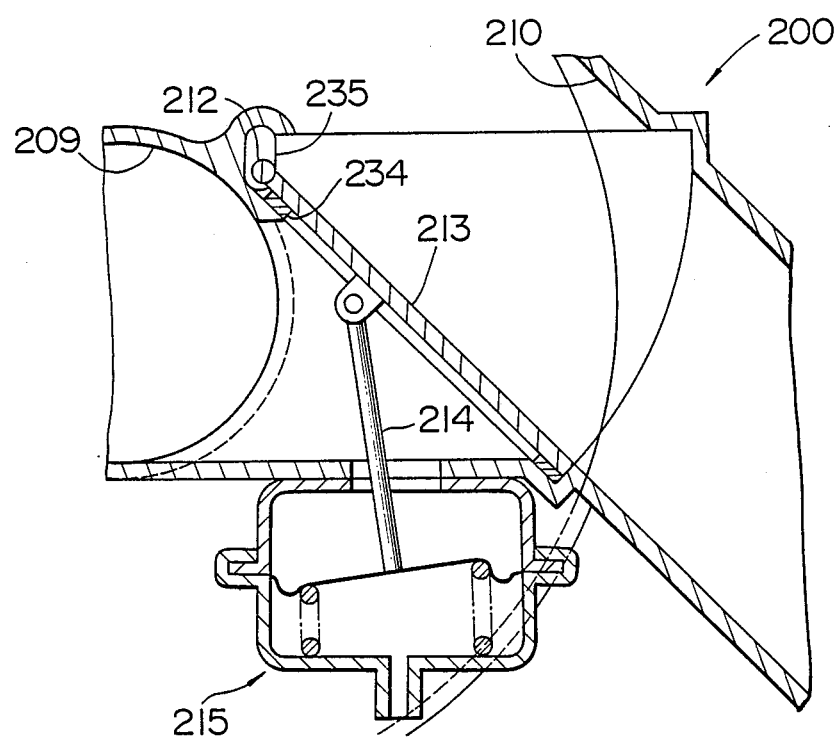
Figure 18:
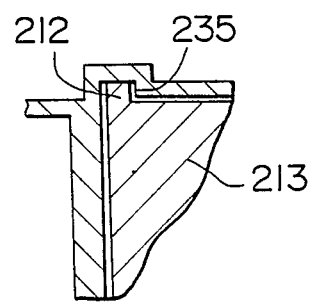

FIGS. 16 to 18 illustrate a third embodiment of the present invention.

In this embodiment, a square frame-shaped gasket 234 having an aperture is provided at the outlet of the first intake passage 209 on the side of the combustion chamber 209, as shown in FIGS. 16 and 17, so as to improve the sealing properties when the on-off valve has closed the first intake passage 209. Furthermore, a shaft 212 of the on-off valve 213 is supported by an oval baring portion 235, as shown in FIGS. 16 to 18, where FIG. 18 is a cross-sectional view taken along the line XVIII—XVIII of FIG. 16.

In the intake apparatus thus constructed, when the on-off valve 213 closes the second intake passage 210, as shown in FIG. 16, the shaft 212 of the on-off valve 213 is located on the upper side (in FIG. 16) of the bearing portion 235. When the on-off valve 213 is moved from the upper position above to a position for closing the first intake passage 209 by means of the vacuum actuator 215 via the rod 214, the shaft 212 of the on-off valve 213 also moves to the lower side of the bearing portion 235. The on-off valve 213 is driven by the vacuum actuator 215 in conjunction with the movement of the shaft 212 and is brought into contact with the gasket 234, thereby press-contacting, for sealing, with the entire periphery of the gasket 234.

Thus, since the gasket 234 is provided on the entire periphery of an outlet, at a side of the combustion chamber, of the first intake passage 209, the sealing properties at the time when the on-off valve 213 closes the first intake passage 209 can be improved. In addition, since the shaft 212 of the on-off valve 213 is supported by the oval bearing portion 235 movably therein, the on-off valve 213 is prevented from coming into partial contact with the gasket 234, so that the fear or possibility of leakage from the seal can be avoided. Consequently, the leakage of the pressure waves occurring during the intake stroke of an internal combustion engine can be prevented, so that maximum intake efficiency characteristics can be obtained.

Figure 19:
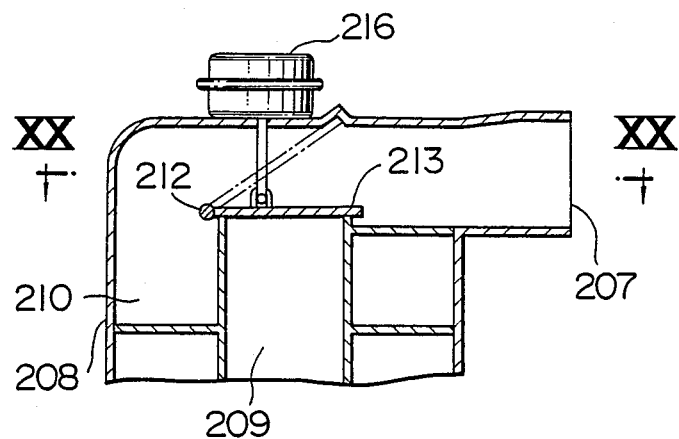
Figure 20:
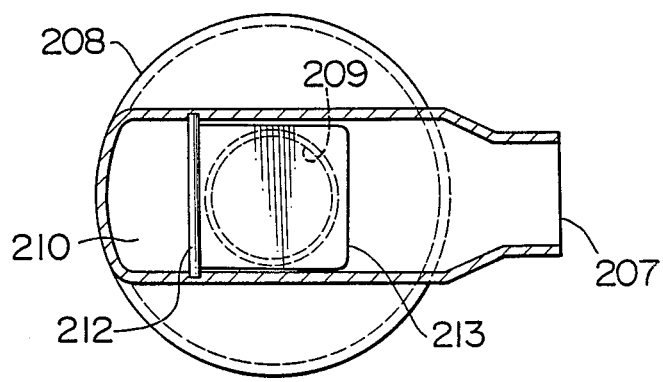

FIGS. 19 and 20 illustrate a fourth embodiment of the present invention.

Although in the foregoing embodiments the pivotal shaft 212 is disposed in parallel with the first intake passage 209, the pivotal shaft 212 may be alternatively disposed orthogonally to the first intake passage 209 as shown in FIGS. 19 and 20.

Figure 21:
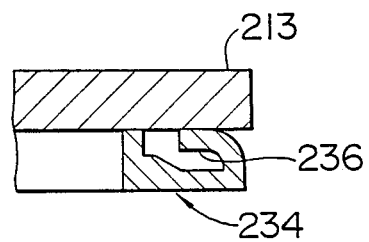
FIG. 21 is a cross-sectional view of a gasket used in the fourth embodiment of the present invention.

FIG. 21 illustrates a fifth embodiment of the present invention.

Although in the third embodiment, the gasket 234 provided in the outlet, at a side of the combustion chamber, of the first intake passage 209 has been in the form of the square frame, the gasket 234 may be alternatively provided with a lip 236, as shown in FIG. 20.

The present invention can be modified in various forms, some of which are described hereinafter.

Although in the foregoing embodiments as example has been shown in which the second intake passage 210 is provided helically around the outer periphery of the first intake passage 209, the second intake passage 210 may be formed volutely around the outer periphery of the first intake passage 209.

Although both the first and second intake passages 209, 210 are accomodated inside the downstream-side case 208 of the air cleaner 200 in the embodiments described above, they may be provided inside the upstream-side case 206 located upstream of the filter element 203

In addition, although the on-off valve 213 is driven by the vacuum actuator 215 in the embodiments described above, the on-off valve 213 may be driven by other type of actuator including a motor, hydraulic pressure device, or the like.

Moreover, although the on-off valve 213 is changed over by means of a single predetermined engine speed, the closing and opening of the valve 213 may be made at different engine speeds so that hysteresis may be provided during opening/closing control of the valve 213.

Furthermore, in addition to the first and second intake passages 209, 210, another intake passage having a different legth may be provided, and that opening and closing operations of the intake passage may be controlled in accordance with the operating state of the vehicle.

Although the axial-flow-type air cleaner 200 is used in the embodiments described above, it is also possible to employ an air cleaner using a square- or chrysanthemum-type filter element.

What is claimed is:

1. An intake apparatus for an internal combustion engine, comprising:

an air cleaner device including an outer casing, for introducing clean air into a combustion chamber of said internal combustion engine;

first intake passage means, entirely disposed within said air cleaner device at a substantially central portion of an interior of said air cleaner device, and communicating with said combustion chamber of said internal combustion engine;

second intake passage means, entirely disposed within said casing of said air cleaner device to helically surround an outer periphery of said first intake passage means, and which selectively communicates with said combustion chamber of said internal combustion engine and has a length which is greater than a length of said first intake passage means;

valve means, disposed at a position on an outlet side of said first and second intake passage means at which the outlet side of said first intake passage means is prevented from interfering with the outlet side of said second intake passage means when said first intake passage means is closed by said valve means and said second intake passage means is opened, for selectively changing over between a communication state and a shutting off state between said combustion chamber of said internal combustion engine and each of said first and second intake passage means;

drive means for driving said valve means to cause said valve means to effect said changing-over operation; and a controller for controlling said drive means in correspondence with an operating state of said internal combustion engine to allow said valve means to effect said changing-over operation.

2. An intake apparatus for an internal combustion engine according to claim 1, wherein said valve means is in the form of a tabular structure disposed at a joint portion where the outlet side of said first intake passage means and the outlet side of said second intake passage means joins together, the tabular structure having a pivotal shaft at one end thereof.

3. An intake apparatus for an internal combustion engine according to claim 1, wherein said valve means rotates to move between its different positions, and a joint portion where said valve means is disposed is provided with a step area, against which an external surface of said valve means, except for said pivotal shaft, abuts when said valve means is located at a terminating point of its rotation.

4. An intake apparatus for an internal combustion engine, comprising:

an air cleaner device including an outer casing, for introducing clean air into said combustion chamber of said internal combustion engine;

first intake passage means, entirely disposed within said air cleaner casing and selectively communicating with a combustion chamber of said internal combustion engine;

second intake passage means entirely disposed within said air cleaner casing and selectively communicating with said combustion chamber of said internal combustion engine and whose length is greater than a length of said first intake passage means;

valve means, disposed at a position on an outlet side of said first and second intake passage means, at which the outlet side of said first intake passage means is prevented from interfering with the outlet side of said second intake passage means when said first intake passage means is closed by said valve means and said second intake passage means is opened, for selectively changing over between a communication state and a shutting off state between said combustion chamber of said internal combustion engine and each of said first and second intake passage means;

drive means for driving said valve means in such a manner as to cause said valve means to effect said changing-over operation; and a controller for controlling said drive means in correspondence with an operating state of said internal combustion engine to allow said valve means to effect said changing-over operation, said controller including means for controlling said drive means so as to set said valve means in any of a) a first position for shutting off said first intake passage means and opening said second intake passage means, b) a second position for shutting off said second intake passage means and opening said first intake passage means, and c) a third position, which is an intermediate position between said first and second positions, for partially opening said first and second passage means, respectively.

5. An intake apparatus for an internal combustion engine according to claim 4, wherein said controller means includes means for (1) first determining when an engine speed of said internal combustion engine is lower than a predetermined engine speed, (2) closing said first intake passage means by controlling said valve means to open said second intake passage means based on said first determining, (3) second determining when said engine speed of said internal combustion engine is higher than said predetermined engine speed, and (4) opening said first intake passage means by said valve means and closing said second intake passage means is by said valve means based on said second determining.

6. An intake apparatus for an internal combustion engine according to claim 4, wherein said drive means is constituted by a two-stage vacuum actuator which has two operating stages.

* * * * *